United States Patent
Chapman et al.

(10) Patent No.: US 8,355,167 B2
(45) Date of Patent: Jan. 15, 2013

(54) METHOD AND APPARATUS FOR USING PATTERN COLOR SPACE IN PRINT JOB PROCESSING

(75) Inventors: Edward Chapman, Rochester, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 996 days.

(21) Appl. No.: 12/392,582

(22) Filed: Feb. 25, 2009

(65) Prior Publication Data

US 2010/0214595 A1 Aug. 26, 2010

(51) Int. Cl.
*H04N 1/60* (2006.01)

(52) U.S. Cl. ...... 358/1.9; 358/1.14; 358/1.15; 358/1.17; 358/1.18

(58) Field of Classification Search .......................... None
See application file for complete search history.

(56) References Cited

U.S. PATENT DOCUMENTS

| | | | |
|---|---|---|---|
| 5,740,338 A * | 4/1998 | Gauthier et al. | 358/1.17 |
| 5,937,153 A * | 8/1999 | Gauthier | 358/1.17 |
| 6,599,325 B2 * | 7/2003 | Gauthier et al. | 715/210 |
| 6,662,270 B1 | 12/2003 | Sans et al. | |
| 6,869,238 B2 * | 3/2005 | Ishiguro | 400/76 |
| 7,133,158 B2 | 11/2006 | Ghose et al. | |
| 7,184,168 B2 * | 2/2007 | Beckman et al. | 358/1.18 |
| 7,280,250 B2 | 10/2007 | Payne | |
| 7,280,258 B2 * | 10/2007 | Kitahara et al. | 358/501 |
| 7,315,979 B1 * | 1/2008 | Walker | 715/234 |
| 7,324,241 B2 | 1/2008 | Eschbach et al. | |
| 7,345,782 B2 | 3/2008 | Kumar | |
| 7,375,844 B2 * | 5/2008 | Kitahara et al. | 358/1.6 |
| 7,379,209 B1 | 5/2008 | Dalton | |
| 7,391,529 B2 | 6/2008 | Glaspy, Jr. et al. | |
| 7,456,990 B2 * | 11/2008 | Gauthier | 358/1.15 |
| 7,580,153 B2 * | 8/2009 | Eschbach et al. | 358/1.9 |
| 2002/0089686 A1 * | 7/2002 | Kitahara et al. | 358/1.14 |
| 2002/0165883 A1 | 11/2002 | Sans et al. | |
| 2002/0191219 A1 | 12/2002 | Bondy et al. | |

(Continued)

FOREIGN PATENT DOCUMENTS

WO WO2004/090745 * 10/2004

OTHER PUBLICATIONS

Bolek, "METAPOST and patterns", TUGboat, vol. 19 (1998), No. 3, Proceedings of the 1998 Annual Meeting, pp. 276-283.

(Continued)

*Primary Examiner* — Dung Tran
(74) *Attorney, Agent, or Firm* — Fay Sharpe LLP

(57) ABSTRACT

A method for creating a pattern color space for use during print job processing may include: a) defining a variable portion of the pattern color space, b) defining a fixed portion of the pattern color space, c) defining a bounding shape for the pattern color space, d) defining a procedure for painting the variable and fixed portions within the bounding shape, and e) at least temporarily, saving the pattern color space to a storage device. The variable portion of the pattern color space may be based on variable data associated with the print job and an object within the print job may identify the pattern color space for a color parameter. A system using this method may include a storage device, a digital front end, a print controller, and a print engine. Various methods for using the pattern color space during print job processing are also provided.

20 Claims, 10 Drawing Sheets

U.S. PATENT DOCUMENTS

| | | | |
|---|---|---|---|
| 2005/0044494 A1 | 2/2005 | Barnes et al. | |
| 2005/0141035 A1 | 6/2005 | Buckley | |
| 2006/0132825 A1 | 6/2006 | Czudak et al. | |
| 2006/0238800 A1 | 10/2006 | Czudak et al. | |
| 2006/0242568 A1 | 10/2006 | Gatto | |
| 2007/0070378 A1 | 3/2007 | Mazur et al. | |
| 2007/0127942 A1 | 6/2007 | Douglas | |
| 2007/0139680 A1 | 6/2007 | Eschbach et al. | |
| 2007/0139681 A1 | 6/2007 | Eschbach et al. | |
| 2007/0177759 A1* | 8/2007 | Eschbach et al. | 382/100 |
| 2007/0195368 A1 | 8/2007 | Waara | |
| 2008/0013112 A1* | 1/2008 | Yokoyama et al. | 358/1.2 |
| 2008/0093468 A1 | 4/2008 | Fan et al. | |
| 2008/0170255 A1 | 7/2008 | Mazur | |
| 2008/0192297 A1 | 8/2008 | Wang et al. | |

OTHER PUBLICATIONS

FreeFlow® VI Suite Documentation, Glossary & Quick Reference, FreeFlow Variable Information Suite, Version 7.0, Oct. 2008, 32 pages.

Free Flow™ Variable Information Interpreter User's Guide, FreeFlow Version 5.0, Jul. 2006, pp. 1-8, 15-31, and 163-190.

CGColorSpace Reference; Apple, Inc.; Copyright 2003, 2010; 30 pages.

* cited by examiner

FIG. 1
(Prior Art)

METHOD AND APPARATUS FOR USING PATTERN COLOR SPACE IN PRINT JOB PROCESSING

BACKGROUND

The present exemplary embodiment relates generally to creating a pattern color space based at least in part on variable data for use in conjunction with processing a print job. It finds particular application in conjunction with a pattern color space having specialty imaging characteristics that may provide security measures and prevent counterfeiting of printed materials. However, it is to be appreciated that the present exemplary embodiment is also amenable to other uses for pattern color space based at least in part on variable data, such as printing logos, serial numbers, seat locations, or other types of unique identifying information on printed materials.

In security applications, for example, it is desirable to add information to a document that prevents or hinders alterations and counterfeiting. These security elements may conflict with the overall aesthetics of the document. Generally, designers would prefer to have a broader choice for the "look and feel" of security elements.

Specialty imaging may be used in printed materials to provide fraud protection and anti-counterfeiting measures. Some examples are in prescriptions, contracts, documents, coupons, and tickets. Typically, several specialty imaging techniques are used at various positions in a document. However, specialty imaging text techniques take up space (or real estate) in the document. The document designer may attempt to provide specialty imaging effects in a pleasing manner, for example, in a parking sticker.

The FreeFlow® Variable Data Intelligent PostScript Printware (VIPP) Variable Information Suite from Xerox Corporation of Norwalk, Conn. restricts designers to use rectangular areas for security elements of documents. This may be acceptable for locating security elements in headers, footers, and similar areas of documents. However, rectangular security elements may not be as "pleasing" in other document areas.

With reference to FIGS. 1 and 2, typical specialty imaging techniques are implemented in document security elements that are restricted to rectangular areas. This is an example of current specialty imaging capabilities which provide static (i.e., non-dynamic) specialty imaging marks with respect to "design" freedom. In FIG. 1, the rectangular footer provides a logo which incorporates a GlossMark text in the right of the rectangular area. Also, microtext lines, another type of a rectangular element, are included as part of the table delineation in FIG. 1. In FIG. 2, GlossMark text is used in the rectangular area at the bottom, a FluorescentMark text is used in the rectangular area in the top left, and a microtext line is in the center left portion of a parking permit. These elements are useful in the context of security, but lack aesthetic value.

INCORPORATION BY REFERENCE

The following patents, applications, and publications, the disclosures of each being totally incorporated herein by reference, are mentioned: i) *PostScript® Language Reference Manual*, third edition, Adobe Systems Inc., Addison-Wesley Publishing Co., Inc., Reading, Mass., February 1999 (897 pages) (also referred to as "The Red Book"); ii) *PostScript® Language Reference Supplement*, Adobe PostScript 3 Version 3010 and 3011 Product Supplement, Adobe Systems Inc., San Jose, Calif., 30 Aug. 1999 (150 pages) (supplement to "The Red Book"); iii) *PostScript® Language Tutorial and Cookbook*, Adobe Systems Inc., Addison-Wesley Publishing Co., Inc., Reading, Mass., December 1985 (247 pages) (also referred to as "The Blue Book"); iv) *PostScript® Language Program Design*, Adobe Systems Inc., San Jose, Calif., 1988 (226 pages) (also referred to as "The Green Book"); v) *FreeFlow® Variable Information Interpreter User's Guide*, FreeFlow Variable Information Suite Version 5.0, Xerox Corp., July 2006 (196 pages); vi) *FreeFlow® VI Suite Glossary and Quick Reference*, FreeFlow Variable Information Suite Version 7.0, Xerox Corp., October 2008 (28 pages); vii) U.S. Pat. No. 7,324,241, published Jan. 29, 2008, entitled Variable Data Differential Gloss Images, to Eschbach et al. and assigned to Xerox Corp.; viii) U.S. Pat. No. 7,391,529, published Jun. 24, 2008, entitled Apparatus and Method for Managing and Using Reusable Document Components During the Process of Dynamic Document Construction, to Glaspy, Jr. et al. and assigned to Xerox Corp.; ix) U.S. Patent Application Publication No. 2007/0139680, published Jun. 21, 2007, entitled Variable Differential Gloss Font Image Data, to Eschbach et al. and assigned to Xerox Corp.; and x) U.S. Patent Application Publication No. 2007/0139681, published Jun. 21, 2007, entitled Printed Visible Fonts with Attendant Background, to Eschbach et al. and assigned to Xerox Corp.

BRIEF DESCRIPTION

In one aspect, a method for creating a pattern color space for use in conjunction with processing a print job in provided. In one embodiment, the method includes: a) defining a variable portion of the pattern color space in a page description language, b) defining a fixed portion of the pattern color space in the page description language, c) defining a bounding shape for the pattern color space in the page description language, d) defining a procedure for painting the variable and fixed portions within the bounding shape in the page description language, and e) at least temporarily, saving the pattern color space defined in a) through d) to a storage device associated with a printing system and accessible to a print controller for processing the print job and communicating a corresponding bitmap representation of the print job to a print engine. In this embodiment, the variable portion of the pattern color space is based at least in part on variable data associated with the print job and at least one object within the print job identifies the pattern color space for a color parameter. In one embodiment, the storage device includes memory.

In another aspect, a method for processing a print job is provided. In one embodiment, the method includes: a) receiving the print job, including variable data to be used in conjunction therewith, in a page description language at a digital front end associated with a printing system, wherein at least a first object within the print job identifies a pattern color space for a color parameter, b) generating a bitmap representation of the print job in a print controller associated with the printing system, wherein the bitmap portion for the first object is at least partly generated using the method of claim 1 to create the pattern color space using variable data associated with the print job, and c) communicating the bitmap representation to a print engine associated with the printing system for rendering the print job.

In yet another aspect, a computer program product is provided. In one embodiment, the computer program product includes a computer-usable data carrier storing instructions that, when executed by a computer, cause the computer to perform a method for creating a pattern color space for use in conjunction with processing a print job. In one embodiment, the method includes: a) defining a variable portion of the pattern color space in a page description language, b) defining a fixed portion of the pattern color space in the page description language, c) defining a bounding shape for the pattern color space in the page description language, and d) defining a procedure for painting the variable and fixed portions within the bounding shape in the page description language. In this embodiment, the variable portion of the pattern color space is based at least in part on variable data associated with the print job and at least one object within the print job identifies the pattern color space for a color parameter.

In still another aspect, an apparatus for processing a print job is provided. In one embodiment, the apparatus includes a storage device for storing a routine in a page description language that creates a pattern color space for use in conjunction with processing the print job, wherein the routine comprises: i) defining a variable portion of the pattern color space, ii) defining a fixed portion of the pattern color space, iii) defining a bounding shape for the pattern color space, and iv) defining a procedure for painting the variable and fixed portions within the bounding shape, a digital front end for receiving the print job, including variable data to be used in conjunction therewith, in a page description language, wherein at a first object within the print job identifies a pattern color space for a color parameter, a print controller in communication with the digital front end and the storage device for generating a bitmap representation of the print job, wherein the bitmap portion for the first object is at least partly generated using the routine to create the pattern color space using variable data associated with the print job, and a print engine in communication with the print controller for receiving the bitmap representation and rendering the print job. In one embodiment, the storage device includes memory.

BRIEF DESCRIPTION OF THE DRAWINGS

Figure 1:
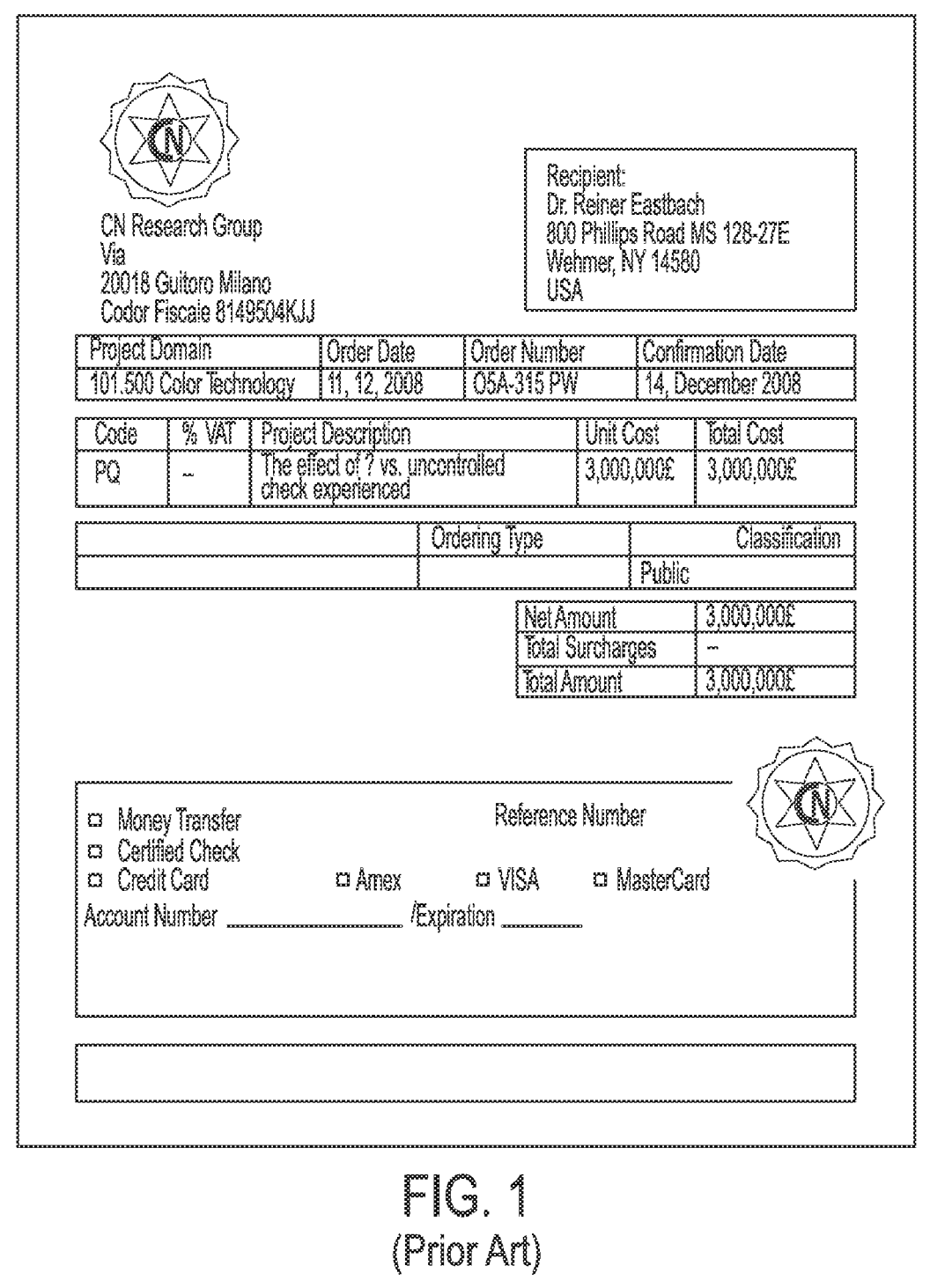

FIG. 1 shows an example of printed material with security elements;

DETAILED DESCRIPTION

The method and apparatus described herein can provide a way to cast specialty imaging elements through a dynamic pattern generation process such that the specialty imaging elements can be used with broader design freedom with less restrictions on the use of variable data (e.g., security properties). For example, the method and apparatus described below can get around VIPP characteristics that restrict the use of specialty imaging techniques to rectangular areas of a document. This may be accomplished by creating a pattern color space that incorporates specialty imaging features using standard page description language (PDL) constructs, such as PostScript constructs. The pattern color space can be selected as a color for a color parameter for an object (e.g., lines, text, geometric shapes, freeform shapes, etc.) or an object characteristic (e.g., line color, fill color, foreground color, background color, etc.) in the document. This may provide higher variable data efficiency for specialty imaging. The method and apparatus provided herein describes how the specialty imaging techniques can be modified and implemented in a way that allows for more dynamic creation of documents and broader design freedom, for example, in creating security documents.

Specialty imaging techniques may be implemented by creating a specialty image object. Alternatively, specialty imaging techniques may be implemented using PDL constructs, such as PostScript constructs, to create a pattern color space, sometimes referred to as a "pattern ink." In other words, within PDL, one can implement specialty imaging text and specialty imaging pattern inks. Rather than defining the specific string to be rendered at a specified location on the page, a specialty imaging string may be used to define a dynamically created pattern ink. This pattern ink is subsequently accessible by other PDL drawing and rendering commands through selection as a color parameter in the command. It is understood that a similar result could be cumbersomely obtained, by filling the entire page with the specialty imaging effect and clipping the desired pieces. However, this cumbersome approach would be inefficient because it would require extensive computational and memory resources and thus not be viable in a variable data scenario (a common application of specialty imaging).

Figure 2:
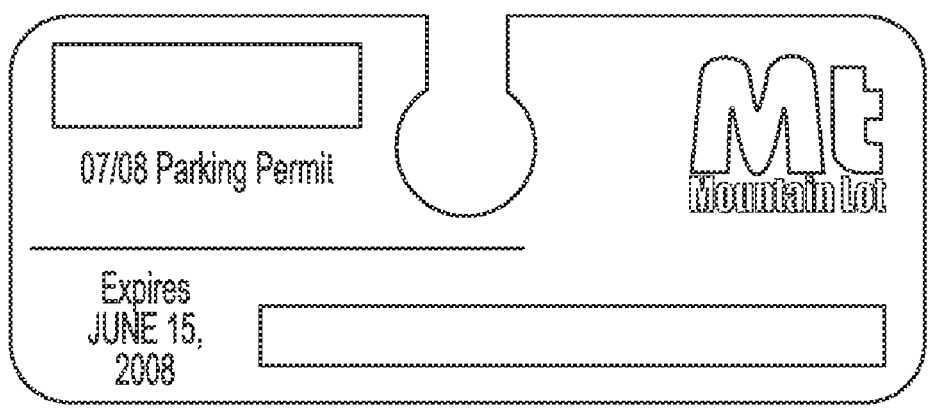
FIG. 2 shows another example of printed material with security elements.
Figure 3:
FIG. 3 shows an exemplary embodiment of a graphic image with certain objects printed with a pattern color space created using variable data.

With reference to FIG. 3, an exemplary graphic illustrates an exemplary embodiment of a process for dynamic creation of pattern inks. Through specialty imaging, the shirt, as well as the cart and the rails, can be changed into security elements on a variable data basis. Theoretically, one could render a large rectangle encompassing the shirt with, for example, GlossMark text. However, one would have to identify the outline of the shirt, compute the bounding box, and compute a matching textstring for the bounding box. Rather, one can define a "tile" of GlossMark text as a pattern ink. This pattern ink can be previously designed with static characteristics. Alternatively, the pattern ink may be dynamically designed in conjunction with the processing of a corresponding print job. Both previously and dynamically-designed pattern inks can also incorporate variable data associated with the print job. This has been done with the string "shirt" for the shirt (see FIG. 5) and "cart" for the cart (see FIG. 6). Additionally, the rails are rendered using a microtext string (see FIG. 6).

An exemplary embodiment of a pattern ink that includes a specialty imaging GlossMark test effect for the string "XEROX!" may be created using the following exemplary PostSript pseudo-code:

/GlossFont /NeueClassic-GL-24 def
/GlossFontsize 28.8 def
/GlossFontstring (XEROX!) def
%% this sets the Font parameters.
  /PatternType 1

-continued

```
%% tiling properties can be defined similar to Holladay dots
   /BBox [0 0 GlossFontstring stringwidth pop GlossFontsize ]
   /XStep GlossFontstring stringwidth pop
   /YStep smallfontsize
%% geometric values for the tiling rectangle
   /PaintProc
   { 0 0 moveto GlossFontstring show
   }
%% this creates the variable data string defined through GlossFontstring
matrix makepattern
/GlossTextPaint exch def
%% identifying the patterns as GlossTextPaint
```

Figure 4:
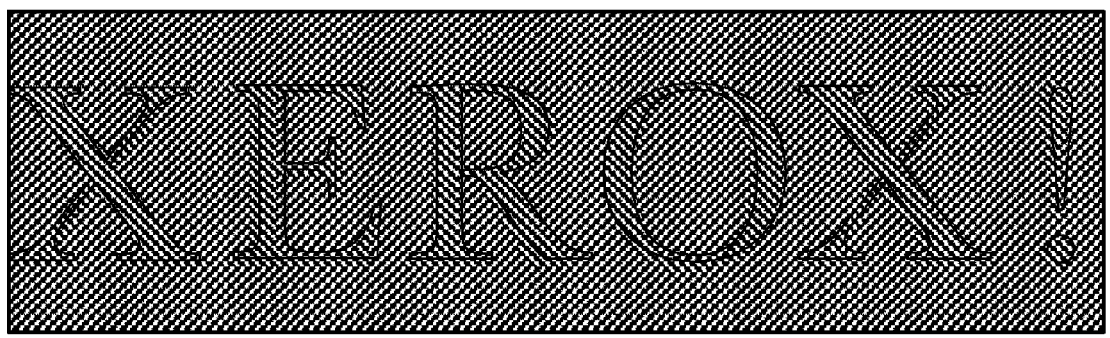
FIG. 4 shows an exemplary embodiment of a pattern color space created using variable data.

FIG. 4 shows the exemplary pattern ink (or pattern color space) created by the PostSript pseudo-code listed above. The string "XEROX!" can be traced as the texture change of the halftone for this pattern ink. In this example, the pattern color space of FIG. 4 is available as a "color" or "ink" selection for subsequent PostScript drawing commands. Note that the geometry and size of the pattern in FIG. 4 may be characterized as a fixed portion of the of the pattern ink. In the example above, the geometry and size of the pattern is created in the first step of the pseudo code.

In one embodiment, a pattern ink (or pattern color space) used for tiling is defined with respect to an origin of a page (i.e., the pattern ink is available for all objects on the page, except for image objects) and not with respect to a specific object. For example, this means that the GlossMark Text inside the shirt may start with the letter "X" or any other letter of the string depending on the location of the object in relation to the page. In other words, two identical shirts, drawn at different locations on the page may have different internal GlossMark patterns, since their starting position varies. In the unlikely case, that the relative offset between the two shirts is identical to a multiple of the tile size, the GlossMark patterns for the two shirts may be identical. Typically, the efficiency obtained in the variable data scenario outweighs any drawbacks caused by this page location relationship for the pattern color space.

Figure 5:
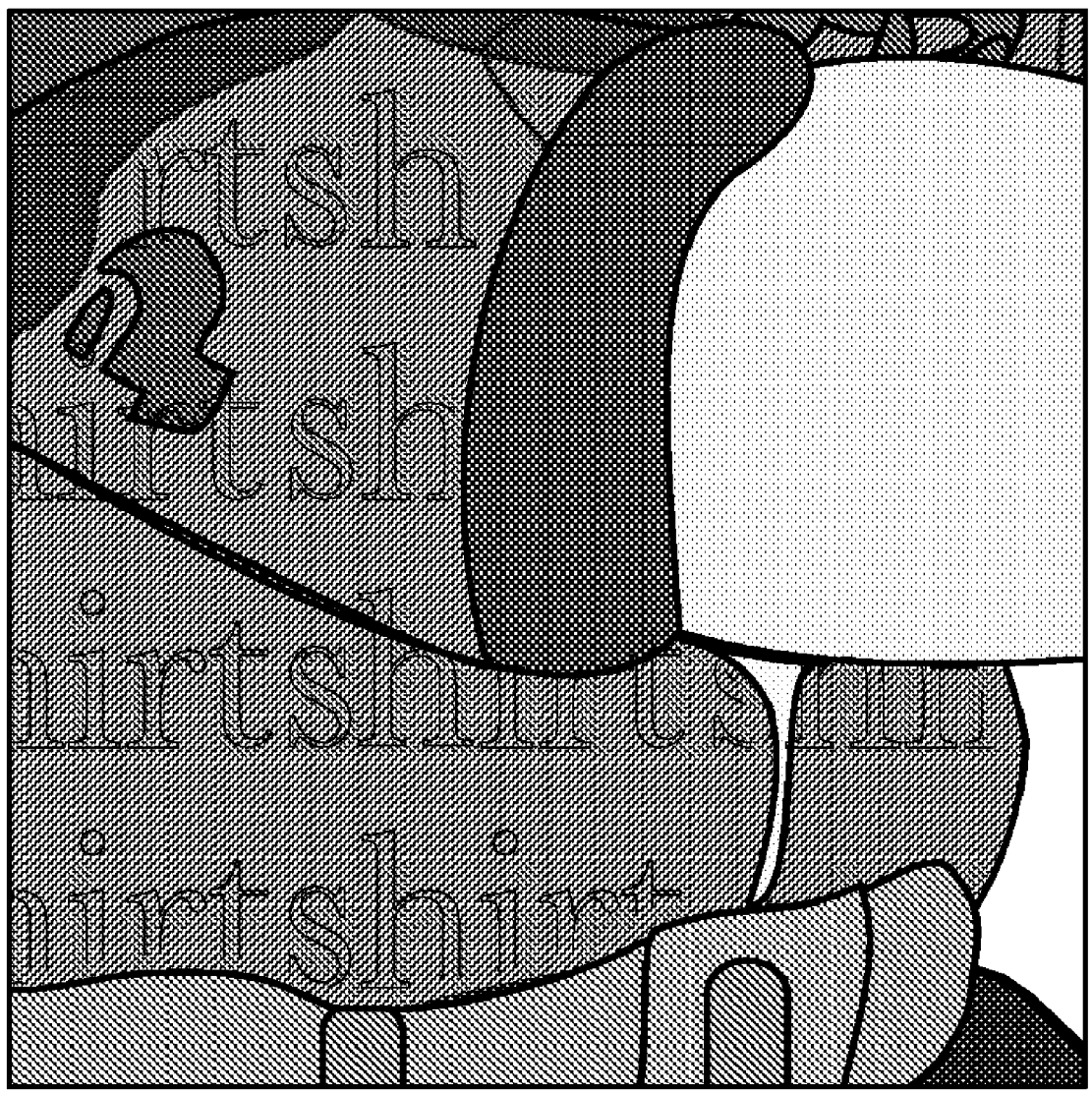
FIG. 5 shows a portion of the graphic image of FIG. 3 with an object filled with the pattern color space of FIG. 4.

With reference to FIG. 5, the pattern ink of FIG. 4 is used as the fill color for the shirt of FIG. 3 using the word "shirt" as the variable data string (rather than "Xerox!"). In other words, the word "shirt" is used as GlossMark text to create the pattern ink used to render the bat area of FIG. 3. The word "shirt" is tiled with respect to other occurrences of the word which is based on the tile size for the pattern ink. Note that the tiles are not positioned to be aligned with the graphics object. As such, the visual impact of the security elements is more related to their presence than to their absolute fitting to the object. For static objects, alignment of the security elements can be done using standard processes.

Figure 6:
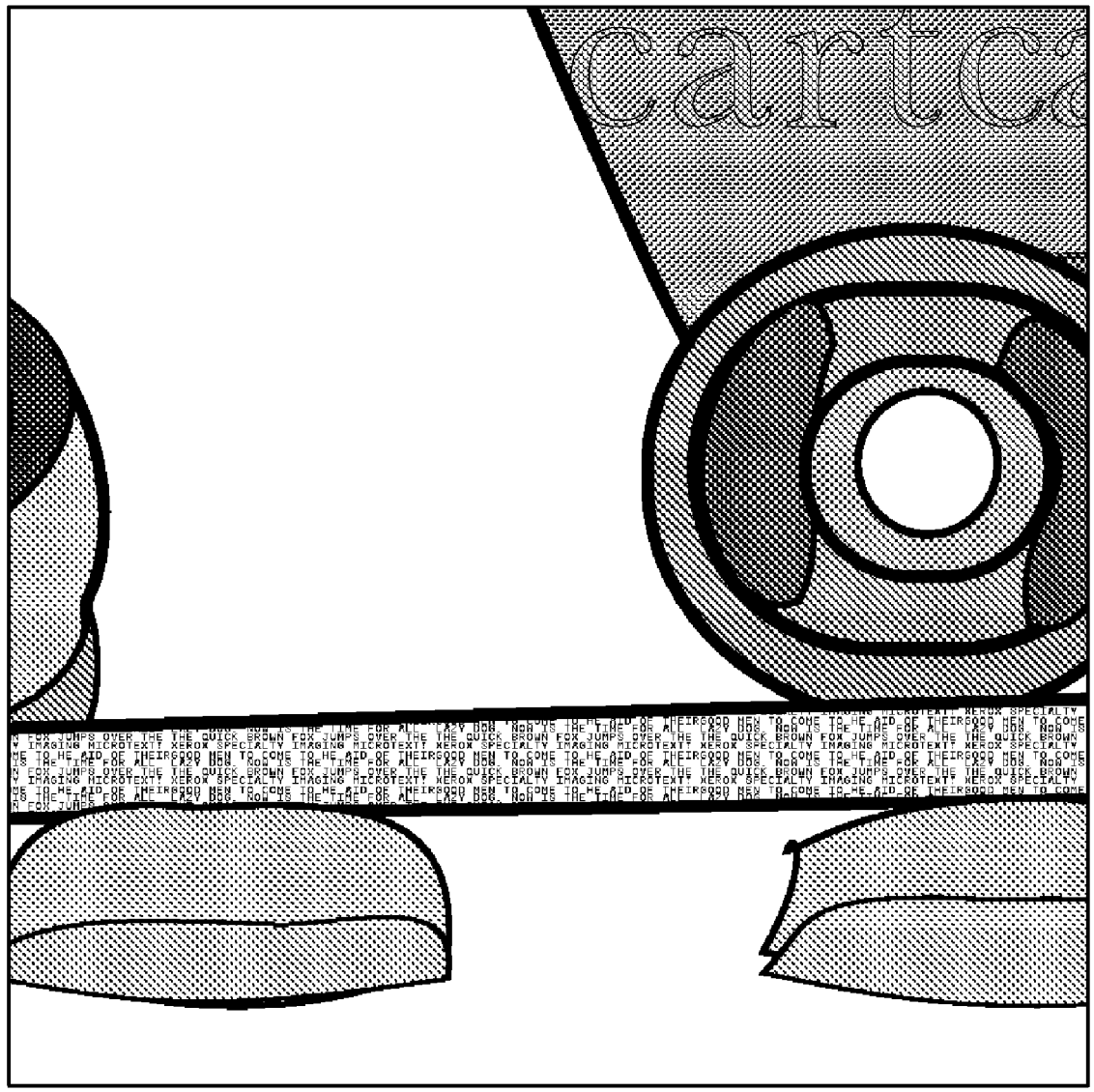
FIG. 6 shows another portion of the graphic image of FIG. 3 with another object filled with another exemplary embodiment of a pattern color space using variable data.

Of course, multiple pattern inks can be defined. For example, a pattern consisting of lines of microtext may be defined and used to render the rails at the bottom of the graphic. FIG. 6 provides an enlargement of a small area of the rails to show this pattern ink with microtext.

The method and apparatus described herein makes it possible to create fully variable graphics objects that encapsulate specialty imaging effects. This was previously only possible for static images. The variable data capability for the pattern ink scenario outweighs any limitations on design variations.

Figure 7:
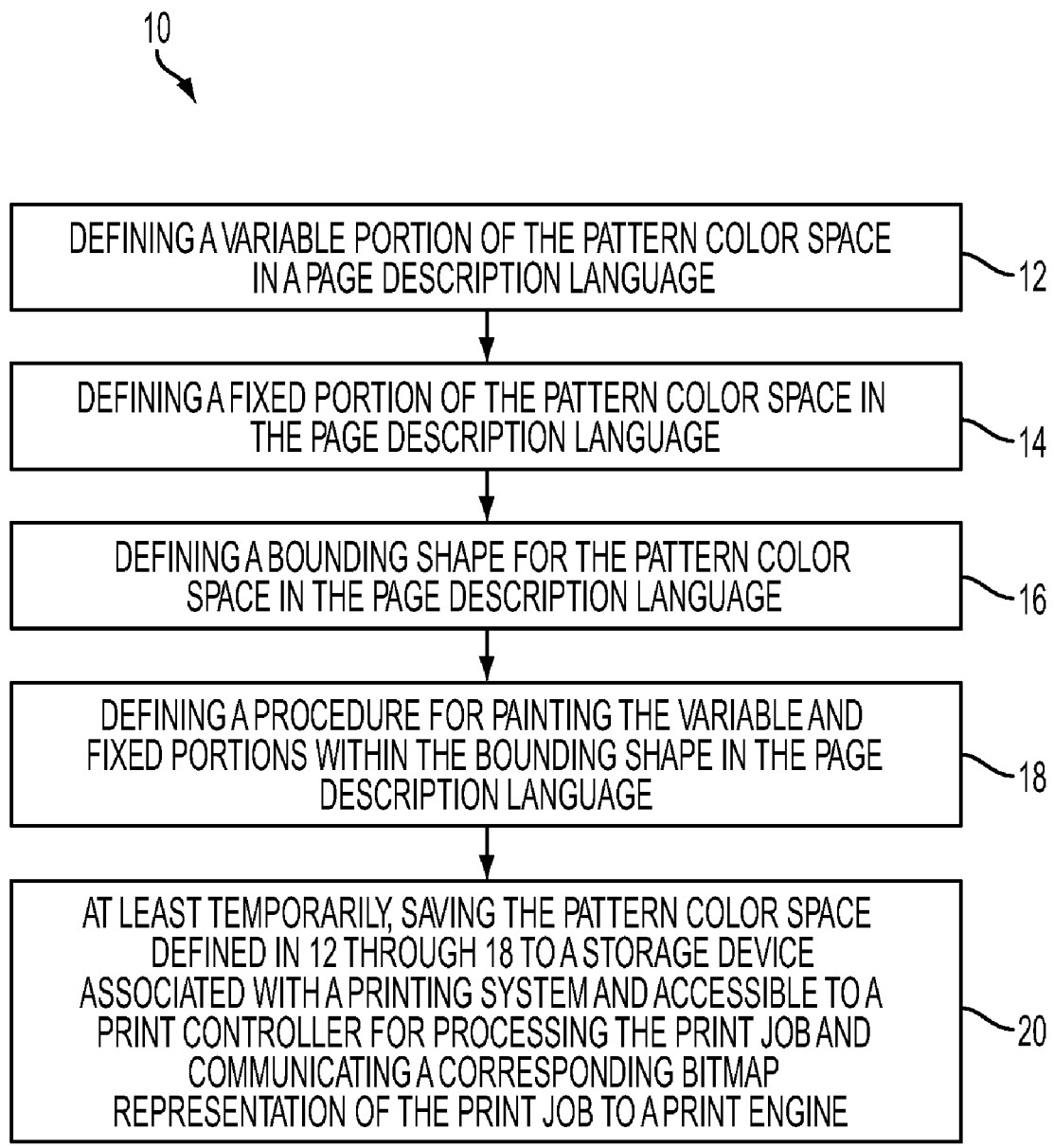
FIG. 7 is a flowchart of an exemplary embodiment of a process for creating a pattern color space for use in conjunction with processing a print job.

With reference to FIG. 7, an exemplary embodiment of a process 10 for creating a pattern color space for use in conjunction with processing a print job begins at 12 where a variable portion of the pattern color space is defined in a PDL. At 14, a fixed portion of the pattern color space is defined in the PDL, based on the variable input. It is the geometry of this fixed portion that defines the tiling across the page. Next, a bounding shape for the pattern color space is defined in the PDL (16). At 18, a procedure for painting the variable and fixed portions within the bounding shape is defined in the PDL. Next, the pattern color space defined in 12 through 18 is at least temporarily saved to a storage device. The storage device may be associated with a printing system and may be accessible to a print controller for processing the print job and communicating a corresponding bitmap representation of the print job to a print engine. The variable portion of the pattern color space may be based at least in part on variable data associated with the print job. At least one object within the print job may identify the pattern color space for a color parameter. In one embodiment, PostScript may be used as the PDL. In other embodiments, any other PDL (e.g., intelligent printer data stream (IPDS), personal printer data stream (PPDS), portable document format (PDF), printer command language (PCL), extensible markup language (XML), etc.) may be used.

In another embodiment, the variable portion of the pattern color space may define at least one of a variable gloss image, a variable microtext string, a variable fluorescent image, a variable infrared image, and a variable correlation image. In additional embodiments, the variable portion of the pattern color space may define any variable security element available now or in the future through variable data systems, such as VIPP. In still another embodiment, the defining in 12 may include defining a variable text string and font parameters associated therewith. In yet another embodiment, the defining in 14 may include specifying a bitmap pattern and tiling parameters associated therewith.

In still yet another embodiment, the defining in 16 may include defining a bounding perimeter based at least in part on size parameters associated with the variable portion defined in 12. In one embodiment, the bounding perimeter may form a rectangle. In other embodiments, the bound perimeter may form any type of geometric or freeform shape. In another embodiment, the bounding perimeter may provide a minimum grout margin around the variable portion defined in 12.

In another embodiment, the defining in 18 may include defining a reference point within the bounding shape defined in 16 in relation to painting the variable portion defined in 12. In still another embodiment, the defining in 18 may include defining a reference point within the bounding shape defined in 18 in relation to tiling and painting the fixed portion defined in 14.

The various features of the process 10 disclosed herein may be implemented using hardware, software, or firmware in any suitable combination. When variable data is provided in relation to variable parameters associated with the variable portion of the pattern color space, the actual pattern color space to be rendered is fully defined. The process 10 may be used to dynamically create a pattern color space during the processing of a print job based on variable data associated with the print job. Alternatively, the process 10 may be used to create a re-useable pattern color space that is saved for use during subsequent processing of print jobs. Variable data may be provided in advance of a print job if it is desirable to pre-process the re-useable pattern color space prior to processing the print job.

Figure 8:
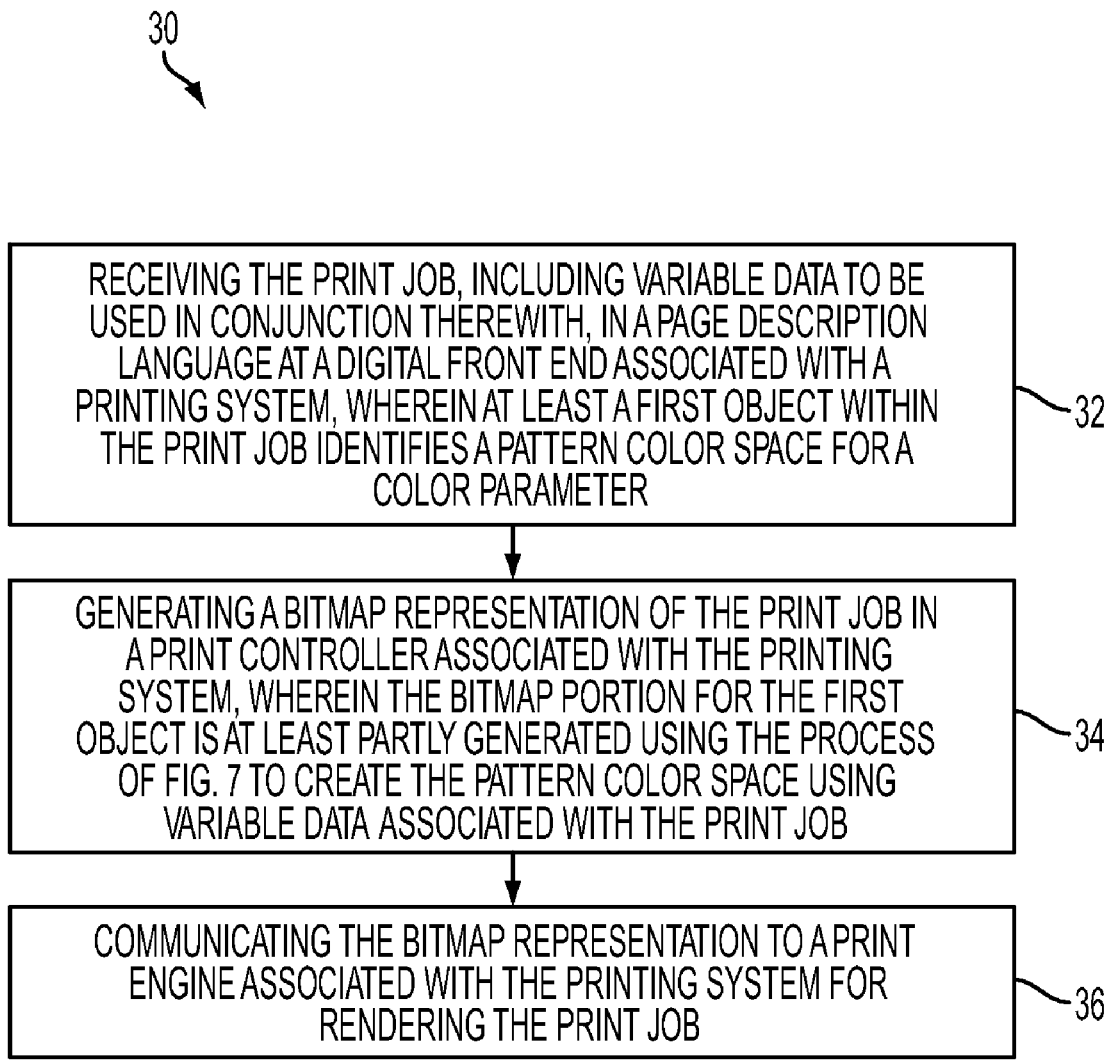
FIG. 8 is a flowchart of an exemplary embodiment of a process for processing a print job using the process of FIG. 7.

With reference to FIG. 8, an exemplary embodiment of a process 30 for processing a print job may begin at 32 where the print job, including variable data to be used in conjunction therewith, in a PDL is received at a digital front end associated with a printing system. At least a first object within the print job may identify a pattern color space for a color parameter. At 34, a bitmap representation of the print job is generated in a print controller associated with the printing system. The bitmap portion for the first object may at least partly be generated using the process 10 of FIG. 7 to create the pattern color space using variable data associated with the print job. Next, the bitmap representation is communicated to a print engine associated with the printing system for rendering the print job (36). In one embodiment, PostScript may be used as the PDL. In other embodiments, any other PDL (e.g., IPDS, PPDS, PDF, PCL, XML, etc.) may be used.

In another embodiment, the first object may include at least one straight line segment that identifies the pattern color space for line color. In this embodiment, the generating in 34 may include painting each at least one straight line segment with the pattern color space in a tiling manner.

In still another embodiment, the first object may include at least one freeform line segment that identifies the pattern color space for line color. In this embodiment, the generating in 34 may include painting each at least one freeform line segment with the pattern color space in a tiling manner.

In yet another embodiment, the first object may include a geometric shape that identifies the pattern color space for fill color. In this embodiment, the generating in 34 may include painting the interior of the geometric shape with the pattern color space in a tiling manner. In one embodiment, the geometric shape may be rectangular. In other embodiments, the geometric shape may form any type of geometric shape, including non-rectangular shapes.

In still yet another embodiment, the first object may include a freeform shape that identifies the pattern color space for fill color. In this embodiment, the generating in 34 may include painting the interior of the freeform shape with the pattern color space in a tiling manner.

In another embodiment, the variable data may include a text string associated with the variable portion of the pattern color space for one or more object within the print job. In still another embodiment, the pattern color space for one or more object within the print job may include specialty imaging that provides fraud protection for printed materials resulting from the print job. In this embodiment, the specialty imaging may include at least one of a gloss image, a microtext string, a fluorescent image, an infrared image, and a correlation image.

The various features of the process 30 disclosed herein may be implemented using hardware, software, or firmware in any suitable combination.

Figure 9:
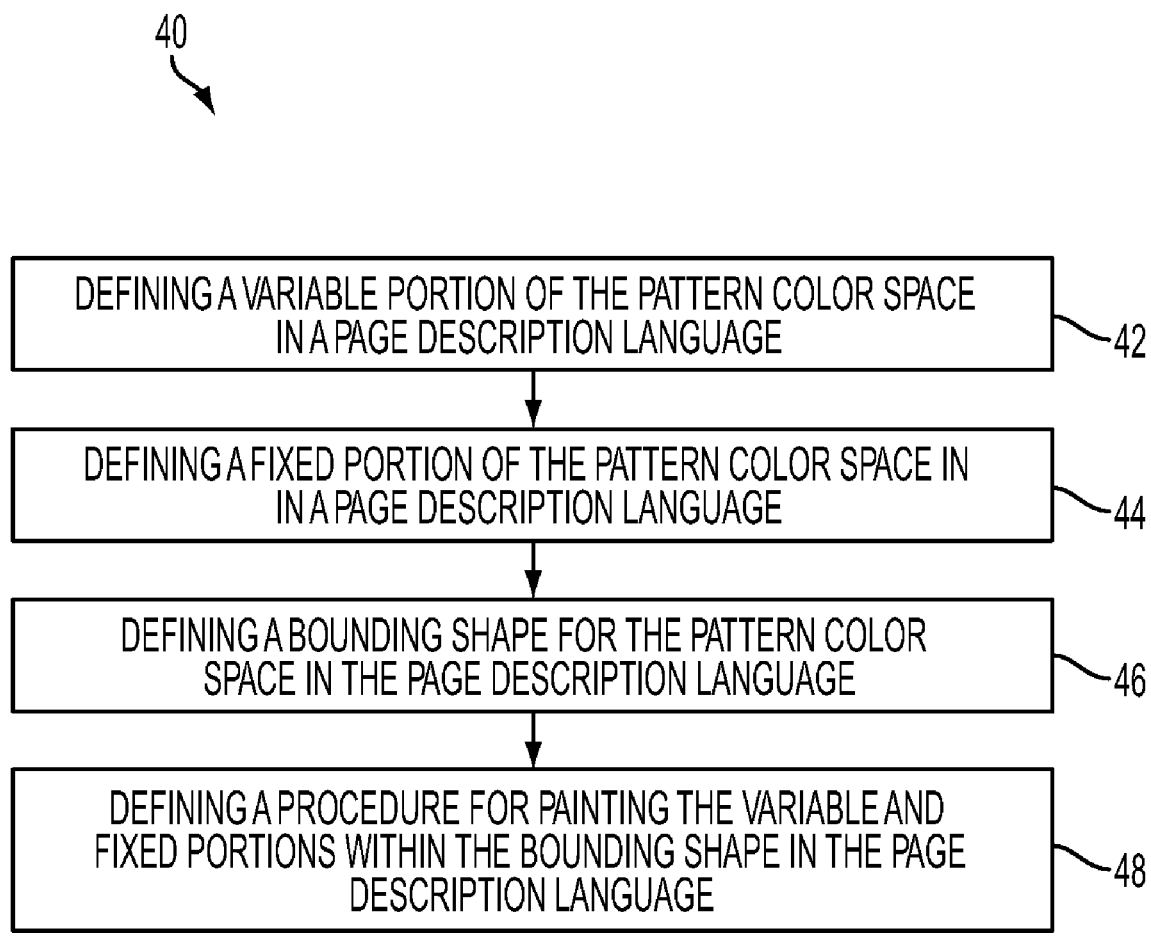
FIG. 9 is a flowchart of an exemplary embodiment of a process for creating a pattern color space for use in conjunction with processing a print job in relation to an exemplary embodiment of a computer program product.

With reference to FIG. 9, an exemplary embodiment of a computer program product may include a computer-usable data carrier storing instructions that, when executed by a computer, cause the computer to perform an exemplary embodiment of a process 40 for creating a pattern color space for use in conjunction with processing a print job. The process 40 may include defining a variable portion of the pattern color space in a PDL (42), defining a fixed portion of the pattern color space in the PDL (44), defining a bounding shape for the pattern color space in the PDL (46), and defining a procedure for painting the variable and fixed portions within the bounding shape in the PDL (48). The variable portion of the pattern color space may be based at least in part on variable data associated with the print job. At least one object within the print job may identify the pattern color space for a color parameter. In one embodiment, PostScript may be used as the PDL. In other embodiments, any other PDL (e.g., IPDS, PPDS, PDF, PCL, XML, etc.) may be used.

The various features of the process 40 disclosed herein may be implemented using hardware, software, or firmware in any suitable combination.

Figure 10:
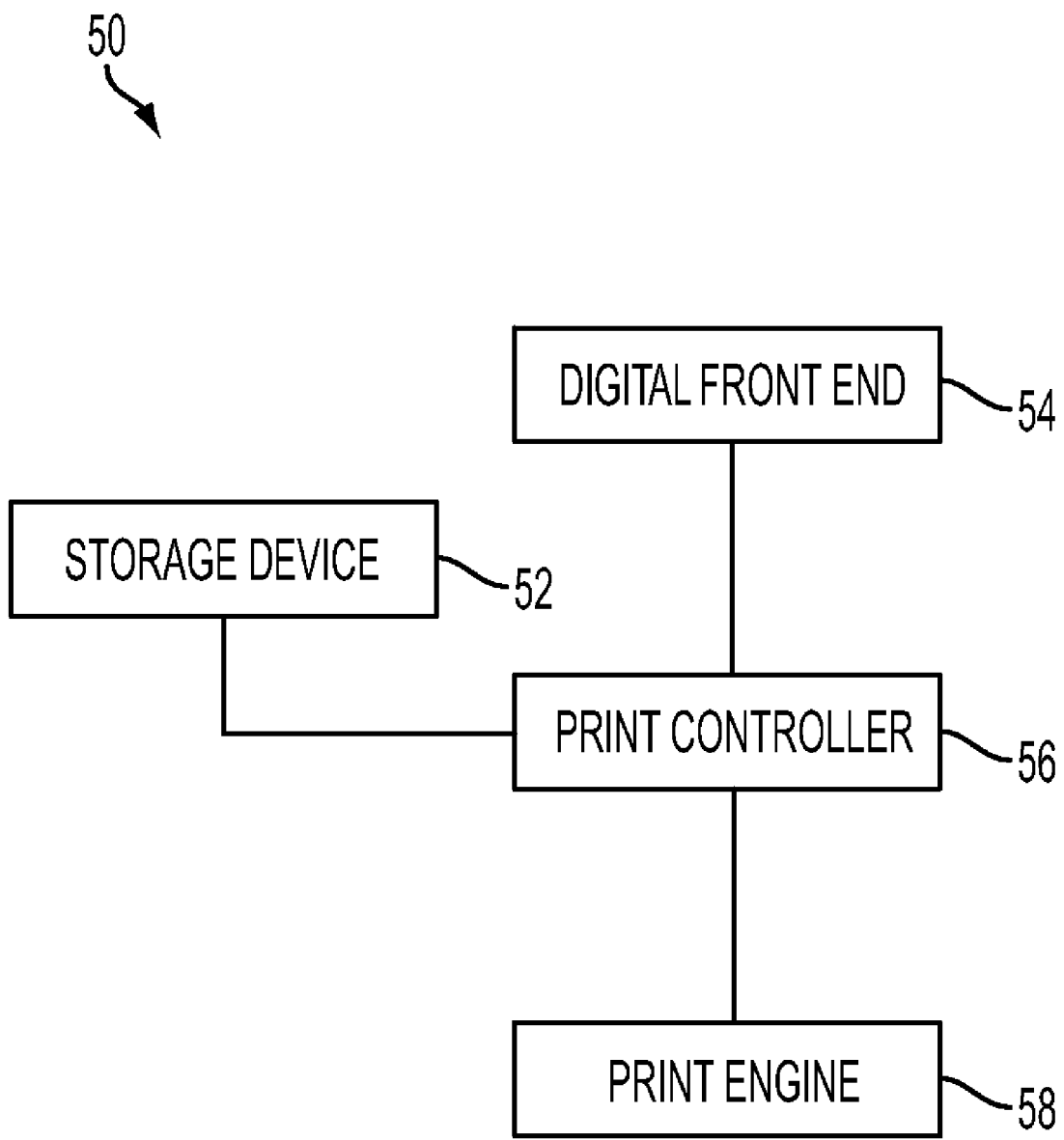
FIG. 10 is a block diagram of an exemplary embodiment of a system for processing a print job in which a pattern color space is created.

With reference to FIG. 10, an exemplary embodiment of a system 50 for processing a print job may include a storage device 52, a digital front end 54, a print controller 56, and a print engine 58. The various features of the system 50 disclosed herein may be implemented using hardware, software, or firmware in any suitable combination.

The storage device 52 may store a routine in a PDL that creates a pattern color space for use in conjunction with processing the print job. The routine may include i) defining a variable portion of the pattern color space, ii) defining a fixed portion of the pattern color space, iii) defining a bounding shape for the pattern color space, and iv) defining a procedure for painting the variable and fixed portions within the bounding shape. In one embodiment, the storage device 52 may include memory associated with the print controller. For example, the storage device 52 may include cache memory for the print controller 56. In other embodiments, the storage device 52 may include any combination of suitable storage devices. The storage device 52 or a component thereof may be separate and even remote from the print controller 56. In one embodiment, PostScript may be used as the PDL. In other embodiments, any other PDL (e.g., IPDS, PPDS, PDF, PCL, XML, etc.) may be used.

The digital front end 54 may receive the print job, including variable data to be used in conjunction therewith, in a PDL. At a first object within the print job may identify a pattern color space for a color parameter. As shown, the print controller 56 may be in operative communication with the digital front end 54 and the storage device 52. The print controller 56 may generate a bitmap representation of the print job. The bitmap portion for the first object may at least partly be generated using the routine to create the pattern color space using variable data associated with the print job. The print engine 58 may be in operative communication with the print controller 56 to receive the bitmap representation and render the print job.

It will be appreciated that various above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A method for creating a pattern color space for use in conjunction with processing a print job, comprising:
   a) defining a variable portion of a pattern color space in a page description language;
   b) defining a fixed portion of the pattern color space in the page description language;
   c) defining a bounding shape for the pattern color space in the page description language;
   d) defining a procedure for painting the variable and fixed portions within the bounding shape in the page description language; and
   e) at least temporarily, saving the pattern color space defined in a) through d) to a storage device associated with a printing system and accessible to a print controller for processing a prospective print job and communicating a corresponding bitmap representation of the prospective print job to a print engine, wherein the variable portion of the pattern color space is based at least in part on variable data associated with the prospective print job and at least one object within the prospective print job identifies the pattern color space for a color parameter.

2. The method set forth in claim 1 wherein the variable portion of the pattern color space defines at least one of a variable gloss image, a variable microtext string, a variable fluorescent image, a variable infrared image, and a variable correlation image.

3. The method set forth in claim 1, the defining in a) comprising:
   f) defining a variable text string and font parameters associated therewith.

4. The method set forth in claim 1, the defining in b) comprising:
   f) specifying a bitmap pattern and tiling parameters associated therewith.

5. The method set forth in claim 1, the defining in c) comprising:
   f) defining a bounding perimeter based at least in part on size parameters associated with the variable portion defined in a).

6. The method set forth in claim 5 wherein the bounding perimeter forms a rectangle.

7. The method set forth in claim 5 wherein the bounding perimeter provides at least a minimum grout margin around the variable portion defined in a).

8. The method set forth in claim 1, the defining in d) comprising:
   f) defining a reference point within the bounding shape defined in c) in relation to painting the variable portion defined in a).

9. The method set forth in claim 1, the defining in d) comprising:
   f) defining a reference point within the bounding shape defined in c) in relation to tiling and painting the fixed portion defined in b).

10. A method for processing a print job, comprising:
    receiving an actual print job, including variable data to be used in conjunction therewith, in a page description language at a digital front end associated with a printing system, wherein at least a first object within the actual print job identifies a pattern color space for a color parameter;
    generating a bitmap representation of the actual print job in a print controller associated with the printing system, wherein the bitmap portion for the first object is at least partly generated using the method of claim 1 to create the pattern color space using variable data associated with the actual print job; and
    communicating the bitmap representation to a print engine associated with the printing system for rendering the actual print job.

11. The method set forth in claim 10 wherein the first object includes at least one straight line segment that identifies the pattern color space for line color, the generating in b) comprising:
    painting each at least one straight line segment with the pattern color space in a tiling manner.

12. The method set forth in claim 10 wherein the first object includes at least one freeform line segment that identifies the pattern color space for line color, the generating in b) comprising:
    painting each at least one freeform line segment with the pattern color space in a tiling manner.

13. The method set forth in claim 10 wherein the first object includes a geometric shape that identifies the pattern color space for fill color, the generating in b) comprising:
    painting the interior of the geometric shape with the pattern color space in a tiling manner.

14. The method set forth in claim 13 wherein the geometric shape is non-rectangular.

15. The method set forth in claim 10 wherein the first object includes a freeform shape that identifies the pattern color space for fill color, the generating in b) comprising:
    painting the interior of the freeform shape with the pattern color space in a tiling manner.

16. The method set forth in claim 10 wherein the variable data includes a text string associated with the variable portion of the pattern color space for one or more object within the actual print job.

17. The method set forth in claim 10 wherein the pattern color space for one or more object within the actual print job includes specialty imaging that provides fraud protection for printed materials resulting from the actual print job.

18. The method set forth in claim 17 wherein the specialty imaging includes at least one of a gloss image, a microtext string, a fluorescent image, an infrared image, and a correlation image.

19. A computer program product comprising a non-transitory computer-usable data carrier storing instructions that, when executed by a computer, cause the computer to perform a method for creating a pattern color space for use in conjunction with processing a print job, the method comprising:
    a) defining a variable portion of a pattern color space in a page description language;
    b) defining a fixed portion of the pattern color space in the page description language;
    c) defining a bounding shape for the pattern color space in the page description language; and
    d) defining a procedure for painting the variable and fixed portions within the bounding shape in the page description language;
    wherein the variable portion of the pattern color space is based at least in part on variable data associated with a print job and at least one object within the print job identifies the pattern color space for a color parameter.

20. An apparatus for processing a print job, comprising:
    a storage device for storing a routine in a page description language that creates a pattern color space for use in conjunction with processing a prospective print job, wherein the routine comprises: i) defining a variable portion of the pattern color space, ii) defining a fixed portion of the pattern color space, iii) defining a bounding shape for the pattern color space, and iv) defining a procedure for painting the variable and fixed portions within the bounding shape;
    a digital front end for receiving an actual print job, including variable data to be used in conjunction therewith, in a page description language, wherein a first object within the actual print job identifies a pattern color space for a color parameter;
    a print controller in communication with the digital front end and the storage device for generating a bitmap representation of the actual print job, wherein the bitmap portion for the first object is at least partly generated using the routine to create the pattern color space using variable data associated with the actual print job; and
    a print engine in communication with the print controller for receiving the bitmap representation and rendering the actual print job.

* * * * *